(12) United States Patent
Hara

(10) Patent No.: US 7,034,958 B1
(45) Date of Patent: Apr. 25, 2006

(54) METHOD, APPARATUS AND RECORDING MEDIUM FOR PRINTING CONTROL

(75) Inventor: Makoto Hara, Kaisei-machi (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 844 days.

(21) Appl. No.: 09/686,789

(22) Filed: Oct. 12, 2000

(30) Foreign Application Priority Data

Oct. 12, 1999 (JP) ................................ 11/289131

(51) Int. Cl.
*G06F 15/00* (2006.01)

(52) U.S. Cl. ..................... 358/1.9; 358/1.14; 358/1.15; 355/40

(58) Field of Classification Search ................. 358/1.9, 358/1.12, 1.13, 1.14, 1.15, 400, 1.5, 437; 355/40, 41, 42, 50, 53, 54
See application file for complete search history.

(56) References Cited

U.S. PATENT DOCUMENTS

| | | | | |
|---|---|---|---|---|
| 4,860,110 A | * | 8/1989 | Kokubu | ...................... 358/400 |
| 5,745,220 A | * | 4/1998 | Okazaki et al. | ................ 355/54 |
| 5,918,988 A | * | 7/1999 | H.A.M. Van Oijen | ......... 400/76 |
| 6,185,478 B1 | * | 2/2001 | Koakutsu et al. | ............ 700/213 |
| 6,332,170 B1 | * | 12/2001 | Ban | ............................. 710/6 |
| 6,501,556 B1 | * | 12/2002 | Nishii | ....................... 358/1.12 |

* cited by examiner

Primary Examiner—Mark Wallerson
(74) Attorney, Agent, or Firm—Birch, Stewart, Kolasch & Birch, LLP

(57) ABSTRACT

Upon carrying out printing based on order information, a workload of an operator can be reduced. An order file transferred to a laboratory via a network is input to a printing controller and accepted by an order reception device. The order file is temporarily stored in temporary storage and input to a judgment device. The judgment device judges whether a print is a target of automatic printing or manual printing based on the order information described in the order file F. In the former case, the order information and image data to be printed are input to a printer and printing is a carried out. In the latter case, a confirmation device temporarily stores the order file F. An operator regularly confirms the order file of manual printing target and the content of printing by using the confirmation device, and inputs the image data to be printed and the order file to the printer to carry out printing.

24 Claims, 4 Drawing Sheets

FIG.3

| PRINT TYPE | QUANTITY LIMIT |
|---|---|
| POSTCARDS | 10 |
| ORDINARY PRINTS | 100 |

FIG.4

| NUMBER | TYPE | QUANTITY |
|---|---|---|
| 001 | POSTCARDS | 30 |
| 002 | ORDINARY PRINTS | 10 |
| 003 | POSTCARDS | 10 |

…

METHOD, APPARATUS AND RECORDING MEDIUM FOR PRINTING CONTROL

BACKGROUND OF THE INVENTION

1. Field of the Invention

The present invention relates to a method and an apparatus for controlling printing means so as to receive order information and to carry out printing according to the order information. The present invention also relates to a computer-readable recording medium storing a program to cause a computer to execute the printing control method.

2. Description of the Related Art

Digital photographic service systems for carrying out various kinds of digital photographic services such as storing photographic images obtained by a user in an image server after digitization, providing the images to the user after recording the images in a CD-R, and receiving an order of additional prints of the images have been known. In such a system, a user reproduces the images by installing, in his/her personal computer, dedicated viewer software for reproducing images recorded in a CD-R. In the case where an additional print is ordered, the user generates an order file describing the content of the order by using an ordering function of the viewer software. The user then brings the order file and the CD-R to a DPE store and the DPE store sends the order file and the CD-R to a laboratory where the ordered image is generated.

Furthermore, network photographic service systems for storing (registering) digital images of users in systems of service providers and for receiving printing orders or the like via networks such as the Internet have also been proposed as one form of the digital photographic service systems.

In such a network photographic service system, a server computer (hereinafter called an "image server") having a scanner, a printer, and a large-capacity disc is installed in a wholesale laboratory for providing the digital photographic services to users. Images photographed by users are stored in the image server and various kinds of services such as ordering additional prints, attachment of the images to an e-mail message, and downloading of image data are provided by enabling the users to access the image server via a network. In such a service, a user accesses the image server from his/her personal computer by using predetermined application software and orders an additional print or the like. Meanwhile, in the laboratory, photographic processing such as additional print generation, generation of picture postcards, generation of an album, composition of images, and trimming is carried out on the image data based on order information from the user and transfers the processed data to the user or notifies the user of completion of the processing by using an e-mail message.

The "order information" herein referred to means information such as a processing number indicating the content of the service (such as additional print generation and postcard generation), an image number indicating an image, a print size, a print quantity, the quality of print paper (glossy or non-glossy), thickness of the print paper, the content of the photographic processing, and trimming information.

In the network photographic service system described above, printing is carried out after an operator in the laboratory has confirmed the content of the order information. In the case where the content of the order information is a printing order including text, such as postcard generation, it is necessary to confirm the content of the text or the arrangement of the text. Therefore, confirmation by the operator is indispensable. However, depending on the content of the order information, confirmation of all the order information merely increases a workload on the operator, since there are some cases where printing can be carried out immediately without confirmation, such as the case of ordinary printing of only one photograph.

The present invention has been conceived based on consideration of the above problem. An object of the present invention is therefore to provide a printing control method and a printing control apparatus enabling reduction of an operator's workload upon carrying out printing according to order information, and also to provide a computer-readable recording medium storing a program to cause a computer to execute the printing control method.

SUMMARY OF THE INVENTION

A printing control method of the present invention is a method of controlling print output of an image from printing means based on order information regarding the print output, and the method comprises the steps of:

receiving the order information;

judging whether a print based on the order information is a target of automatic printing or manual printing;

issuing a printing instruction to the printing means to carry out printing based on the order information in the case where the print has been judged to be the target of automatic printing; and suspending the printing instruction to the printing means until a predetermined printing instruction is issued, in the case where the print has been judged to be the target of manual printing.

The "order information" herein referred to is generated by a user on his/her personal computer or the like by referring to an image obtained by the user from a CD-R or by downloading.

For the order information, various kinds of format such as a format enabling writing or selection of the content of an order corresponding to each image in index images, or a format enabling writing or selection of the content of an order corresponding to the names of an image file can be used. As the content of the order information, a processing number indicating the content of a service (such as additional print generation or postcard generation), an image number indicating the image, a print size, a print quantity, the quality of print paper (glossy or non-glossy), the thickness of the print paper, the content of photographic processing, and trimming information can be used, for example.

As one form of order information reception, reception via a network or reception by reading the order information recorded in a removable recording medium such as an FD, an MO disc, or a ZIP disc brought to the laboratory can be used, for example.

"Judging whether a print based on the order information is a target of automatic printing or manual printing" refers to judging whether the automatic printing or the manual printing needs to be carried out based on the content of the order information. For example, in the case where the content of the order information is "printing 5 ordinary prints", confirmation by an operator is not necessary. Therefore, the prints are judged to be the target of automatic printing. In the case where the content of the order information is "generation of 20 postcards", the postcards are judged to be the target of manual printing, since the confirmation by an operator is necessary.

"Issuing a printing instruction to the printing means" refers to causing the printing means to carry out printing according to the order information by inputting image data corresponding to the content of the order information to the printing means. If the printing means carries out printing immediately after the image data are input thereto, the instruction is issued by inputting the image data to the printing means.

The "predetermined printing instruction" is an instruction to the printing means to carry out printing after the operator has confirmed the content of the order information.

"Suspending the printing instruction to the printing means" refers to suspending processing regarding the order information without carrying out printing in the case where the print has been judged to be the target of manual printing. If the printing means carries out printing immediately after input of the image data, the printing instruction is suspended by suspending the input of the image data to the printing means. When a plurality of items of the order information are processed consecutively, in the case where a plurality of the order information items have been judged to be the targets of manual printing, the printing instructions regarding the order information items are suspended. The operator regularly confirms the content of the order information items whose printing instructions have been suspended, to carry out printing based on the order information items for manual printing.

A plurality of printing means may exist. In this case, printing means dedicated to automatic printing and manual printing are used. In the case where the print has been judged to be the target of automatic printing, printing means dedicated to automatic printing carries out printing. On the other hand, printing is carried out by the printing means dedicated to manual printing in the case where the print has been judged to be the target of manual printing.

In the printing control method of the present invention, it is preferable for the order information to be transferred via a network.

In the printing control method of the present invention, it is preferable for the judgment of the automatic printing target or the manual printing target to be made based on the content of the order information by referring to a table indicating judgment criteria.

The "table" describes the judgment criteria as to whether automatic printing or manual printing is suitable based on the content of the order information. By referring to this table, it can be judged whether the print is the target of automatic printing or manual printing based on the order information.

In the printing control method of the present invention, it is preferable for the order information to include information indicating whether the print is the target of automatic printing or manual printing.

A printing control apparatus of the present invention is an apparatus for controlling print output of an image from printing means based on order information regarding the print output. The printing control apparatus comprises:

reception means for receiving the order information;

judgment means for judging whether a print based on the order information is a target of automatic printing or manual printing;

instruction means for issuing a printing instruction to the printing means to carry out printing based on the order information in the case where the print has been judged to be the target of automatic printing; and confirmation means for suspending the printing instruction to the printing means until a predetermined printing instruction is issued, in the case where the print has been judged to be the target of manual printing.

In the printing control apparatus of the present invention, it is preferable for the order information to be transferred via a network.

Furthermore, in the printing control apparatus of the present invention, it is preferable for the judgment means to judge by referring to a table indicating criteria of judgment as to whether automatic printing or manual printing is suitable based on the content of the order information.

Moreover, in the printing control apparatus of the present invention, it is also preferable for the order information to include information indicating whether the print is the target of automatic printing or manual printing.

The printing control method of the present invention may be provided as a program stored in a computer-readable recording medium to cause a computer to execute the printing control method.

According to the present invention, in the case where the print based on the order information has been judged to be the target of automatic printing, the printing instruction is issued to the printing means and the printing based on the order information is carried out. Meanwhile, in the case where the print based on the order information has been judged to be the target of manual printing, the printing instruction to the printing means is suspended until the predetermined printing instruction is issued. Therefore, printing is carried out immediately when confirmation by the operator is unnecessary, and printing can be suspended until confirmation by the operator if confirmation is necessary. As a result, the operator does not need to confirm the content of the order information in the case of automatic printing. Furthermore, in the case where a plurality of items of order information are processed, printing is suspended for prints whose order information indicates that they are targets of manual printing. Therefore, it becomes unnecessary to constantly monitor a printing operation, which leads to reduction in the operator's workload and efficient printing.

BRIEF DESCTIPTOIN OF THE DRAWINGS

FIG. 3 shows an example of a table stored in judgment means;

Figure 5:
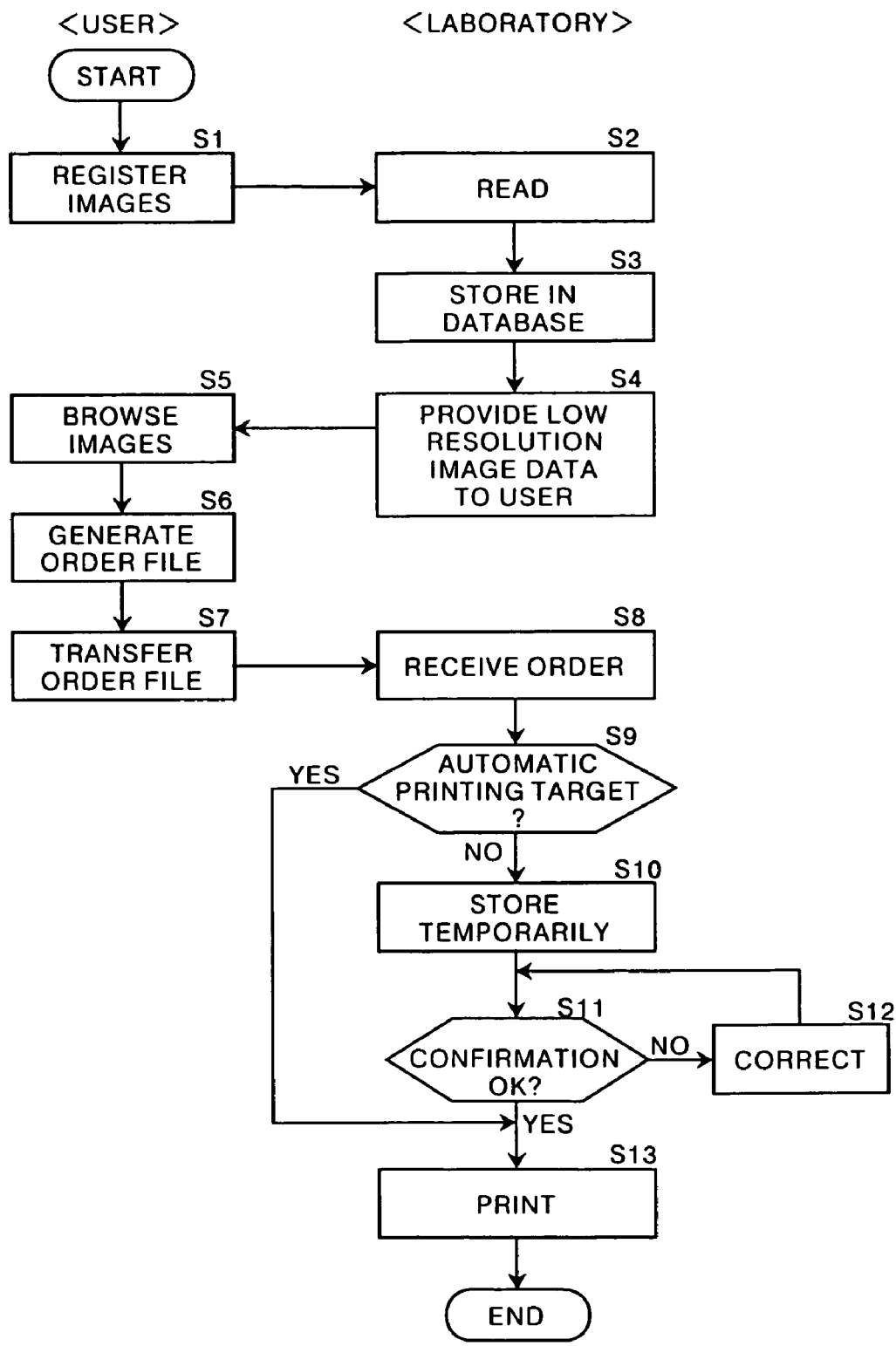

FIG. 4 shown an example of the content of order information stored in temporary storing means; and FIG. 5 is a flow chart showing an operation of the embodiment.

DESCRIPTION OF THE PREDERRED EMBODIMENT

Hereinafter, an embodiment of the present invention will be explained with reference to the accompanying drawings.

Figure 1:
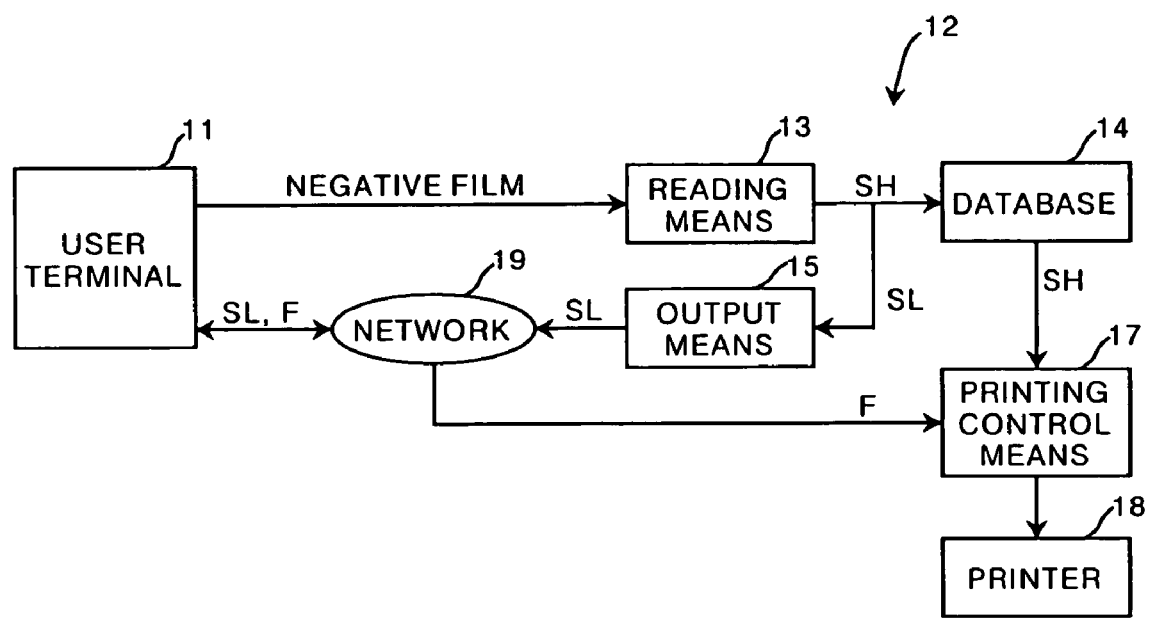
FIG. 1 is a block diagram of a network photographic service system adopting a printing control apparatus according to an embodiment of the present invention.

FIG. 1 is a block diagram showing a network photographic service system adopting a printing control apparatus according to an embodiment of the present invention.

In FIG. 1, a user terminal 11 is a personal computer of a user or an order processing terminal installed at a service provider or the like for users who do not possess a personal computer. A laboratory 12 is a system for carrying out printing. The laboratory 12 comprises reading means 13 for reading images from a film brought in by a user and for obtaining high resolution image data SH and low resolution image data SL, a database 14 for storing the high resolution image data SH, output means 15 for outputting the low resolution image data SL to the user terminal 11 via a network 19, and printing control means 17 for receiving an order file F in which order information has been described by the user and for controlling a printer 18 based on the order information described in the order file F. The user may request printing directly from the laboratory 12, or register via a store dedicated to order reception. The user terminal 11 and the laboratory 12 exchange the image data and the order file F via the network 19.

Figure 2:
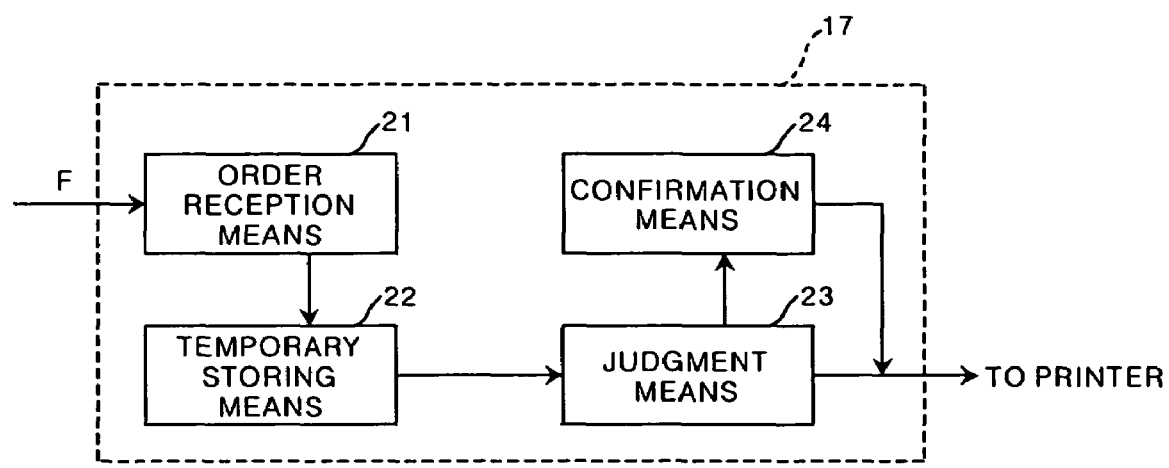
FIG. 2 is a block diagram of printing control means.

FIG. 2 is a block diagram showing an outline configuration of the printing control means 17. As shown in FIG. 2, the printing control means 17 comprises order reception means 21 for receiving the order file F describing the order information generated by the user, temporary storing means 22 for temporarily storing the order file F, judgment means 23 for judging, based on the order information described in the order file F, whether a print is a target of automatic printing or manual printing, and confirmation means 24 for confirming the content of printing in the case where the print has been judged to be the target of manual printing.

The judging means 23 stores a table indicating criteria for judging whether the print is the target of automatic printing or manual printing based on the order information, according to the content of the order information such as a type or quantity of printing. By referring to this table, the judgment means 23 judges whether the print is the target of automatic printing or manual printing based on the order information. An example of this table is shown in FIG. 3. In the table shown in FIG. 3, the type of print and a quantity limit thereof are determined, and when the quantity of prints exceeds the quantity limit, the prints are judged to be the targets of manual printing. For example, in the case where the content of the order information stored in the temporary storing means 22 is as shown in FIG. 4, a number 001 is judged to be the target of manual printing, since it exceeds the quantity limit. However, numbers 002 and 003 are judged to be the targets of automatic printing since they do not exceed the quantity limit.

In other words, in the case where the content of the order information indicates generation of postcards, it is necessary to confirm the text and arrangement thereof. If the prints are confirmed after being generated, all of the prints are wasted in the case where the text has not been printed adequately. In the case of ordinary prints, it is unnecessary to confirm the text arrangement. However, in the case where the quantity of prints is large, the large quantity of prints are wasted if a mistake is found after printing. Therefore, the table is set to indicate manual printing of postcards if the quantity of prints is 10 or more which is a comparatively small quantity. In the case of ordinary printing, the table is set to indicate manual printing if the quantity is 100 or more, which is comparatively large.

The judgment means 23 judges the order information in the order file F. In the case where the prints have been judged to be the targets of automatic printing, the judgment means reads the high resolution image data SH to be printed from the database 14 and transfers the data and the order information to the printer 18 to cause the printer 18 to carry out printing. Meanwhile, in the case where the prints have been judged to be the target of manual printing, the judgment means 23 transfers the order file F to the confirmation means 24 and temporarily stores the order file F therein. In the case where a plurality of order files are temporarily stored in the temporary storing means 22, the content of the order information is judged consecutively. When the prints are the targets of automatic printing, printing is sequentially carried out by the printer 18 while the printing is suspended in the case where the prints are the targets of manual printing.

The confirmation means 24 comprises input means such as a mouse and a keyboard, and a monitor for displaying an image (both not shown). The confirmation means 24 is regularly checked by an operator during a printing operation and the content of printing is displayed on the monitor by an instruction of the operator if the order file F of the manual printing target is temporarily stored. The operator confirms the printing content displayed on the monitor and corrects the content if necessary. The operator inputs an instruction to carry out printing by using the input means. The high resolution image data SH which are necessary for printing are read from the database 14 in response to the instruction and transferred together with the order information to the printer 18 to carry out printing.

Operation of this embodiment will be explained next. FIG. 5 is a flow chart showing the operation of this embodiment. The user brings a negative film to the store for order reception or directly to the laboratory 12, and registers the images (Step S1). In the laboratory 12, the reading means 13 reads the film brought in by the user and obtains the high resolution image data SH and the low resolution image data SL representing the images recorded on the film (Step S2). The high resolution image data SH obtained in this manner are stored in the database 14 (Step S3). Meanwhile, the low resolution image data SL for display and confirmation of the images on the user terminal 11 are provided to the user by the output means 15 (Step S4). The low resolution image data SL are provided to the user by disclosing the data on the network 19 only to the user. In this manner, the user can determine the content of an order by confirming the images on the user terminal 11.

The user browses the low resolution image data SL by using a web browser or the like (Step S5), and generates the order file F describing the order information for placing an order (Step S6). The order file F generated in this manner is transferred to the laboratory 12 via the network 19 (Step 7).

In the laboratory 12, the order file F is received by the order reception means 21 (Step S8) and temporarily stored in the temporary storing means 22. The judgment means 23 judges whether the order information described in the order file F is suitable for automatic printing or manual printing (Step S9). In the case where the prints have been judged to be the targets of automatic printing, the high resolution image data SH are read from the database 14 and input to the printer 18 together with the order file F, and printing is carried out (Step S13). Meanwhile, in the case where the prints have been judged to be the targets of manual printing, the order file F is temporarily stored by the confirmation means 24 (Step S10).

The operator regularly confirms whether or not the order file F is stored in the confirmation means 24. If the order file F is temporarily stored in the confirmation means 24, the content of printing is displayed on the monitor based on the order information in the order file F in response to the instruction by the operator. The operator confirms the content of the printing displayed on the monitor and inputs confirmation from the input means if the content is correct (Step S11), and printing is carried out (Step S13). Meanwhile, if correction is necessary, the operator carries out the correction by inputting the correction from the input means until a result at Step S11 becomes affirmative (Step S12). Once the result at Step S11 becomes affirmative, printing is carried out (Step S13).

As has been described above, in this embodiment, if the prints are the targets of automatic printing not requiring the confirmation by the operator, the printing is carried out immediately. In the case where the prints are the targets of manual printing requiring the confirmation by the operator, printing can be suspended until the confirmation is completed. Therefore, it becomes unnecessary for the operator to confirm the content of printing for the targets of automatic printing. Furthermore, in the case where a plurality of items of the order information are processed consecutively, printing is suspended for the case of the order information regarding the prints of manual printing. Therefore, it becomes unnecessary to constantly monitor the printing operation. In this manner, a workload of the operator can be reduced and printing can be carried out efficiently.

In the above embodiment, the order file F received by the order reception means 21 is temporarily stored in the temporary storing means 22. However, the order file may be input immediately to the judgment means 23. In this case, if the prints have been judged to be the targets of manual printing, the order file F is temporarily stored in the confirmation means 24 as in the above embodiment.

In the above embodiment, based on the order information the prints are judged to be the targets of automatic printing or manual printing, by judging the content of the order information described in the order file F. However, the user may include a judgment result as to whether the prints are the targets of automatic printing or manual printing in the order information by using the user terminal 11. In this case, the user may judge whether the prints are the targets of automatic printing or manual printing. Alternatively, the judgment may be made by allocating the function of the judgment means 23 to the user terminal 11. In this manner, the printing control means 17 in the laboratory 12 can judge whether the prints based on the order information are the targets of automatic printing or manual printing simply by confirming the content of the order information. Therefore, processing becomes faster.

Furthermore, in the above embodiment, the judgment means 23 judges whether the prints are the targets of automatic printing or manual printing by referring to the table indicating the type and the quantity of prints as shown in FIG. 3. However, a print size, a kind of a photosensitive material, a kind of image data (such as JPEG or FlashPix), or a combination of these may be used for judging the automatic printing target and the manual printing target. For example, as to the print size, a print is judged to be the target of automatic printing if the size thereof is L, which is normal. In the case where the size is a special size such as A4, the print is judged to be the target of manual printing, since a cartridge of the printer 18 needs to be changed. If the photosensitive material is glossy, which is frequently used, the print is judged to be the target of automatic printing. In the case where the material is non-glossy which is not frequently used, the print is judged to be the target of manual printing, since a cartridge of the printer 18 needs to be changed. As to the image data, the print is judged to be the target of automatic printing if the image data are of JPEG format which is normally used. In the case where the image data are of a special file format, such as FlashPix, the print is judged to be the target of manual printing.

In the above embodiment, the user transfers the order file F via the network 19 to the laboratory 12. However, the order file F may be recorded in a recording medium such as an FD and brought to the laboratory 12. In this case, the order reception means 21 of the printing control means 17 reads the order file F from the recording medium in order to process the order.

Moreover, in the above embodiment, the high resolution image data SH obtained by the reading means 13 in the laboratory 12 are stored in the database 14 thereof. However, without storing the data in the laboratory 12, the data may be provided to the user by being recorded in a large-capacity recording medium such as a CD-R or an MO disc, or via the network 19. In this case, the user sends the high resolution image data SH to be the target of printing to the laboratory 12 via the network 19 or via a recording medium together with the order file F.

In addition, all of the contents of Japanese Patent Application No. 11(1999)-289131 are incorporated into this specification by reference.

What is claimed is:

1. A printing control method for controlling print output of an image from printing means based on order information regarding the print output, the printing control method comprising the steps of:

receiving the order information;

judging whether a print based on the order information is a target of automatic printing, for which the confirmation of the content of the order information by an operator is not necessary, or a manual printing, for which the confirmation of the content of the order information by an operator is necessary, in accordance with the content of the order information;

issuing a printing instruction to the printing means to carry out printing in the case whether the print has been judged to be the target of automatic printing based on the order information; and suspending the printing instruction to the printing means until a predetermined printing instruction is issued, in the case where the print has been judged to be the target of manual printing.

2. A printing control method as claimed in claim 1, wherein the order information is transferred via a network.

3. A printing control method as claimed in claim 1, wherein the step of judging is carried out by referring to a table indicating criteria of judgment as to whether automatic printing or manual printing is suitable based on the content of the order information.

4. A printing control method as claimed in claim 1, wherein the order information includes information indicating whether the print is the target of automatic printing or manual printing.

5. The printing control method of claim 1, wherein when the prints have been judged to be a target of automatic printing, image data is obtained from a database and included, along with the order information, as part of the printing instruction.

6. The printing control method of claim 1, wherein when the prints have been judged to be a target of manual printing, the order information is sent to a confirmation means that temporarily stores the order information during the suspension of the printing instruction.

7. A printing control apparatus for controlling print output of an image from printing means based on order information regarding the print output, the printing control apparatus comprising:

reception means for receiving the order information;

judgment means for judging whether a print based on the order information is a target of automatic printing, for which the confirmation of the content of the order information by an operator is not necessary, or manual printing, for which the confirmation of the content of the order information by an operator is necessary, in accordance with the content of the order information;

instruction means for issuing a printing instruction to the printing means to carry out printing in the case where the print has been judged to be the target of automatic printing based on the order information; and confirmation means for suspending the printing instruction to the printing means until a predetermined printing instruction is issued, in the case where the print has been judged to be the target of manual printing.

8. A printing control apparatus as claimed in claim 7, wherein the order information is transferred via a network.

9. A printing control apparatus as claimed in claim 7, wherein the judgment means judges by referring to a table indicating criteria of judgment as to whether automatic printing or manual printing is suitable based on the content of the order information.

10. A printing control apparatus as claimed in claim 7, wherein the order information includes information indicating whether the print is the target of automatic printing or manual printing.

11. The printing control apparatus of claim 7, wherein the printing means that carries out the printing is dedicated to automatic printing.

12. The printing control apparatus of claim 7, wherein the printing means that carries out the printing is dedicated to manual printing.

13. The printing control apparatus of claim 7, wherein when the prints have been judged to be a target of automatic printing, image data is obtained from a database and included, along with the order information, as part of the printing instruction.

14. The printing control apparatus of claim 7, wherein when the prints have been judged to be a target of manual printing, the order information is sent to a confirmation means that temporarily stores the order information during the suspension of the printing instruction.

15. A computer-readable recording medium storing a program to cause a computer to execute a printing control method for controlling print output of an image from printing means based on order information regarding the print output, the program comprising the procedures of:

receiving the order information;

judging whether a print based on the order information is a target of automatic printing, for which the confirmation of the content of the order information by an operator is not necessary, or manual printing, for which the confirmation of the content of the order information by an operator is necessary, in accordance with the content of the order information;

issuing a printing instruction to the printing means to carry out printing in the case where the print has been judged to be the target of automatic printing based on the order information; and suspending the printing instruction to the printing means until a predetermined printing instruction is issued, in the case where the print has been judged to be the target of manual printing.

16. A computer-readable recording medium as claimed in claim 15, wherein the order information is transferred via a network.

17. A computer-readable recording medium as claimed in claim 15, wherein the procedure of judging is a procedure of judging by referring to a table indicating criteria of judgment as to whether automatic printing or manual printing is suitable based on the content of the order information.

18. A computer-readable recording medium as claimed in claim 15, wherein the order information includes information regarding whether the print is the target of automatic printing or manual printing.

19. The computer-readable recording medium of claim 15, wherein when the prints have been judged to be a target of automatic printing, image data is obtained from a database and included, along with the order information, as part of the printing instruction.

20. The computer-readable recording medium of claim 15, wherein when the prints have been judged to be a target of manual printing, the order information is sent to a confirmation means that temporarily stores the order information during the suspension of the printing instruction.

21. A printing control method for controlling print output of an image, the image being represented by a digital image from digital printing means based on order information regarding the print output, the printing control method comprising the steps of:

receiving the order information;

judging whether a print is a target of automatic printing, for which the confirmation of the content of the order information by an operator is not necessary, or a manual printing, for which the confirmation of the content of the order information by an operator is necessary, based on the order information;

issuing a printing instruction to the printing means to carry out printing in the case whether the print has been judged to be the target of automatic printing based on the order information; and suspending the printing instruction to the printing means until a predetermined printing instruction is issued, in the case where the print has been judged to be the target of manual printing.

22. A printing control apparatus for controlling print output of an image, the image being represented by a digital image from digital printing means based on order information regarding the print output, the printing control apparatus comprising:

reception means for receiving the order information;

judgment means for judging whether a print is a target of automatic printing, for which the confirmation of the content of the order information by an operator is not necessary, or manual printing, for which the confirmation of the content of the order information by an operator is necessary based on the order information;

instruction means for issuing a printing instruction to the printing means to carry out printing in the case where the print has been judged to be the target of automatic printing based on the order information; and confirmation means for suspending the printing instruction to the printing means until a predetermined printing instruction is issued, in the case where the print has been judged to be the target of manual printing.

23. A computer-readable recording medium storing a program to cause a computer to execute a printing control method for controlling print output of an image, the image being represented by a digital image from digital printing means based on order information regarding the print output, the program comprising the procedures of:

receiving the order information;

judging whether a print is a target of automatic printing, for which the confirmation of the content of the order information by an operator is not necessary, or manual printing, for which the confirmation of the content of the order information by an operator is necessary, based on the order information;

issuing a printing instruction to the printing means to carry out printing in the case where the print has been judged to be the target of automatic printing based on the order information; and suspending the printing instruction to the printing means until a predetermined printing instruction is issued, in the case where the print has been judged to be the target of manual printing.

24. A printing control apparatus for controlling print output of an image from printing means based on order information regarding the print output, the printing control apparatus comprising:

reception means for receiving the order information;

judgment means for judging whether a print is a target of automatic printing, for which the confirmation of the content of the order information by an operator is not necessary, or manual printing, for which the confirmation of the content of the order information by an operator is necessary, based on the order information;

instruction means for issuing a printing instruction to the printing means to carry out printing in the case where the print has been judged to be the target of automatic printing based on the order information;

confirmation means for suspending the printing instruction to the printing means until a predetermined printing instruction is issued, in the case where the print has been judged to be the target of manual printing; and printing control means for controlling the printing operation in the printing means in accordance with the printing instruction.

* * * * *